(No Model.) 3 Sheets—Sheet 1.
J. SUDMANN.
METALLIC THERMOMETER.
No. 398,755. Patented Feb. 26, 1889.
Fig. 1. Fig. 2.
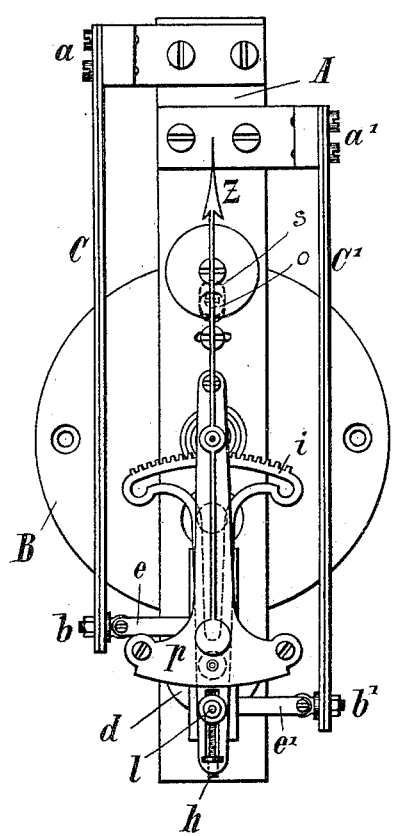
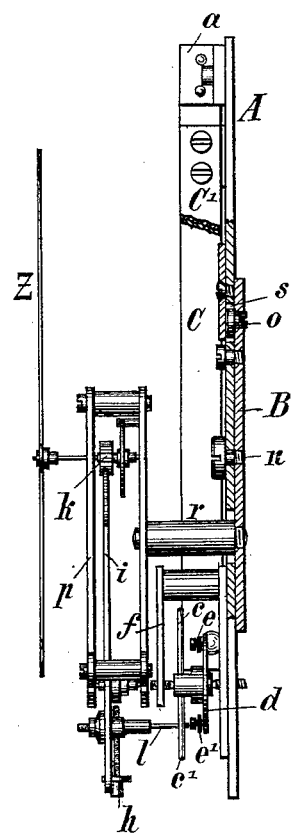
Fig. 3.
Witnesses,
Frank Keys,
Rob. L. Fenwick.
Inventor,
Johann Sudmann,
By Paine & Ladd,
attys.

(No Model.)  3 Sheets—Sheet 2.

J. SUDMANN.
METALLIC THERMOMETER.

No. 398,755.  Patented Feb. 26, 1889.

Witnesses,
Frank Keys
Robt. L. Fenwick.

Inventor,
Johann Sudmann
By Paine & Ladd,
attys.

(No Model.) 3 Sheets—Sheet 3.

J. SUDMANN.
METALLIC THERMOMETER.

No. 398,755. Patented Feb. 26, 1889.

Witnesses,
Frank Keys
Robt. L. Fenwick

Inventor,
Johann Sudmann
By Paine & Ladd
attys.

UNITED STATES PATENT OFFICE.

JOHANN SUDMANN, OF HAMBURG, GERMANY.

METALLIC THERMOMETER.

SPECIFICATION forming part of Letters Patent No. 398,755, dated February 26, 1889.

Application filed December 12, 1887. Serial No. 257,656. (No model.)

*To all whom it may concern:*

Be it known that I, JOHANN SUDMANN, a subject of the Emperor of Germany, and a resident at Hamburg, in the German Empire, have invented certain new and useful Improvements in Metallic Thermometers, of which the following is a specification.

This invention relates to that class of thermometers in which the change of temperature in the surrounding air is ascertained by the unequal expansion of different metal strips soldered together; and the objects of my said invention are, first, to afford means for securing the invariable transmission of the deflection of the compensating strips upon the dial-work independently of the position of the thermometer; second, to provide straight compensating strips for the thermometer; third, to arrange the driving mechanism independently of the dial-work for the purpose of employing a throughout uniformly-divided scale and to regulate the degree of oscillation of the pointer in accordance with the division of the dial plate or scale in the thermometer, and, fourth, to provide means for adjusting the pointer without influencing the driving mechanism. I attain these objects by the mechanism illustrated in the accompanying drawings, in which—

Figure 4:
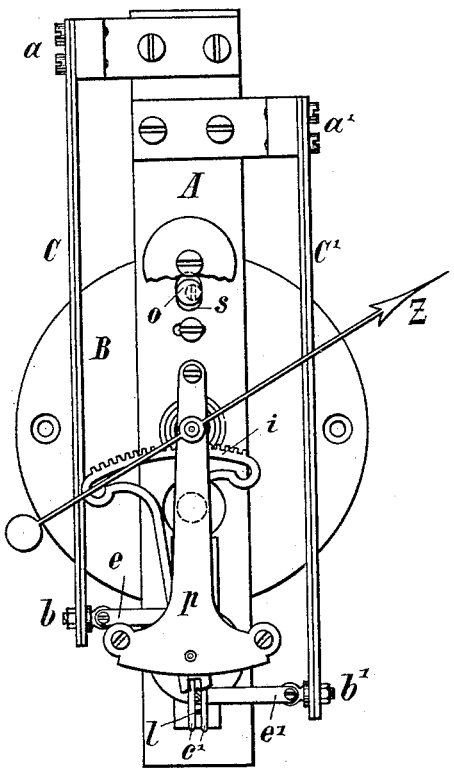
Figure 5:
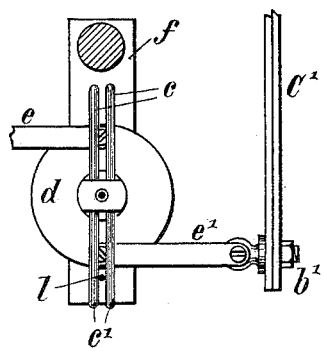
Figure 6:
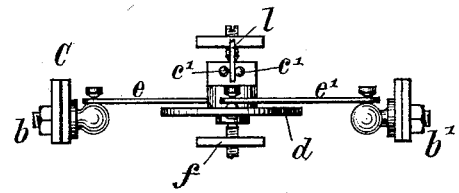
Figure 7:
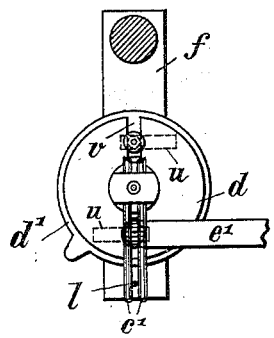
Figure 8:
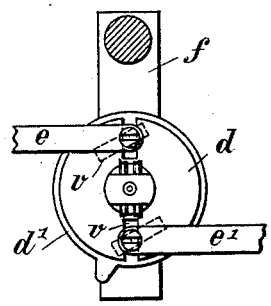
Figure 9:
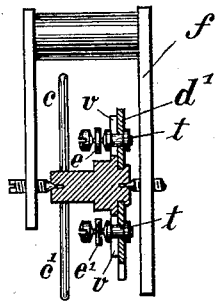

Figures 1 and 4 are front views of the thermometer with removed scale, the pointer being in different positions. Fig. 2 is a side elevation of the thermometer, partly in section. Figs. 3, 5, 6, 7, 8, and 9 are details of the mechanism.

Similar letters refer to similar parts throughout the several views.

The thermometer shown in the drawings is provided with two straight thermometric strips, C C', which are preferable in case the instrument is to be used for scientific observations, while for ordinary use one strip only will be sufficient. These thermometric strips are secured at one end by means of screws to the brackets $a$ and $a'$ of the frame A, and connected at their free ends $b\,b'$ by the links (pitmen) $e\,e'$ with the crank-plate or driving-disk $d$, which transmits the deflection of the compensating strips to the dial-work. The motion of the disk $d$, pivoted in the bracket $f$ of the frame A, is transmitted to the sector $i$ and the pinion $k$ on the spindle of the pointer Z by means of a pair of fork-shaped drivers, $c\,c'$, into which engages the pin $l$, adjustably guided by the screw $h$ in a notch of the sector $i$.

As the motion imparted to the driving-disk by the deflection of the strips is throughout uniform, (as far as the deflection of the strips may be considered as increasing continuously and in direct proportion with the augmentation of the temperature of the surrounding air,) the division of the scale can be made equidistant and independently from the dial-work, provided that the degree of oscillation of the pointer can be adjusted. However, the adjustment may be easily effected by varying the distance of the pins $t$ of the said driving-disk in relation with the center of oscillation of the latter; but when employing two strips a uniform radial movement of both the pins $t$ will be necessary, and therefore underneath of the driving-disk $d$ a corresponding disk, $d'$, is jointed, which is provided (equidistant from the center of the driving-disk) with two slots, $u$, crossing the radial slots $v$ of the driving-disk $d$, into which engage the pins $t$; and it will be clearly understood from the drawings, Figs. 7 and 8, that the turning of the lower plate, $d'$, relatively to the disk $d$ will cause the pins $t$ to move uniformly in the radial slots $v$ of driving-disk $d$. Thus the distance from the center of oscillation of the pins $t$, which are connected by the pitmen $e\,e'$ with the strips, may be varied *ad libitum* within certain limits, and consequently the angle of oscillation of the drivers $c\,c'$ and of the pointer may be easily regulated in accordance with the scale of the dial-work.

In order to adjust the pointer without affecting the driving mechanism, the frame $p$ of the dial-work is mounted on a separate bed-plate, B, fixed to the case of the thermometer, while the frame A, with the driving mechanism, is adapted to swing around a pivot, $n$, of the said stationary bed-plate B. The declination of the center line of the frame A from that of the bed-plate B is governed by an eccentric, $o$, Fig. 3, or a similar device, from the outside of the thermometer-case. As the frame $p$ of the dial-work, by means of the bracket $r$, eccentrically arranged to the pivot $n$, is firmly connected with the stationary bed-plate B, the frame A will turn around the pivot $n$ under the influence of the eccentric $o$, engaging into a notch, $s$, of the frame A. In consequence of the turning of the frame of the driving-work independently from the stationary frame of the dial-work the fork-shaped driver $c\ c'$ of the crank-disk $d$ will take with it the pin $l$, acting upon the sector $i$, and the pinion $k$ on the spindle of the pointer, and thus turning the latter correspondingly forward or backward.

Having now particularly described and ascertained the nature of my invention, I would have it understood that what I claim is—

1. The combination, in a thermometer, of a supporting-frame having a bracket, a metallic strip secured at one end to the same, an indicator and its gearing mounted upon said support, a disk operating said gearing and having the fork-shaped drivers $c\ c'$, pin $l$, and the pitman-connection between said drivers and metallic strip, substantially as set forth.

2. In a metallic thermometer, the combination of the pins $l$ with the driving-disk $d$, having radial slots $v$, the movable plate $d'$, provided with slots $u$, crossing those of the driving-disk, the pitmen $e\ e'$, and the thermometric strips, substantially as set forth, and for the purpose specified.

3. The combination, in a thermometer, of the movable frame A, thermometric strip connected at one end to the same, disk having the other end of said strip connected thereto, gearing and pointer operated by said disk, and the stationary bed-plate B, carrying the dial-work, substantially as set forth.

4. In a metallic thermometer having the driving mechanism secured to a movable frame, A, and the dial-work mounted on a stationary bed-plate, B, the combination of the eccentric $o$ with the said stationary bed-plate and the said movable frame A, substantially as set forth, and for the purpose specified.

In testimony that I claim the foregoing as my invention I have signed my name, in presence of two witnesses, this 27th day of October, 1887.

JOHANN SUDMANN.

Witnesses:
ALEXANDER SPECHT,
DIEDRICH PETERSEN.